US011091180B2

(12) United States Patent
Yoshida et al.

(10) Patent No.: US 11,091,180 B2
(45) Date of Patent: Aug. 17, 2021

(54) BRAKE CONTROL DEVICE FOR ELECTRIC VEHICLE

(71) Applicant: MITSUBISHI ELECTRIC CORPORATION, Tokyo (JP)

(72) Inventors: Taichi Yoshida, Tokyo (JP); Tomoki Watanabe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 225 days.

(21) Appl. No.: 16/073,698

(22) PCT Filed: Feb. 2, 2016

(86) PCT No.: PCT/JP2016/052974
§ 371 (c)(1),
(2) Date: Jul. 27, 2018

(87) PCT Pub. No.: WO2017/134734
PCT Pub. Date: Aug. 10, 2017

(65) Prior Publication Data
US 2019/0031214 A1 Jan. 31, 2019

(51) Int. Cl.
*B61H 11/14* (2006.01)
*B60T 8/17* (2006.01)
(Continued)

(52) U.S. Cl.
CPC ............ *B61H 11/14* (2013.01); *B60T 8/1705* (2013.01); *B60T 8/72* (2013.01); *B60T 8/52* (2013.01);
(Continued)

(58) Field of Classification Search
CPC . B60T 8/1705; B60T 8/72; B60T 8/52; B60T 8/58; B60T 2201/02;
(Continued)

(56) References Cited

U.S. PATENT DOCUMENTS 5,511,859 A * 4/1996 Kade ..................... B60K 6/442
303/3
9,944,290 B2 * 4/2018 Fontvieille ...... B60W 30/18127
(Continued)

FOREIGN PATENT DOCUMENTS

EP         2151363 A1    2/2010
EP         2810811 A1    12/2014
(Continued)

OTHER PUBLICATIONS

Notification of Reasons for Refusal for Japanese Patent Application No. 2017-564990, dated Feb. 27, 2018.
(Continued)

*Primary Examiner* — Anthony R Jimenez
(74) *Attorney, Agent, or Firm* — Buchanan Ingersoll & Rooney PC

(57) ABSTRACT

A variable load calculator calculates a variable load command VL based on AS pressure and a predetermined table. A vehicle deceleration calculator calculates vehicle deceleration α based on a brake notch command BN and a predetermined table. A required braking force calculator calculates required braking force BL by multiplying a weight indicated by the variable load command VL and the vehicle deceleration α. An electric braking controller calculates an electric braking pattern in accordance with the required braking force BL and then transmits the electric braking pattern to an inverter controller. The electric braking controller calculates an electric braking force produced by operation of the electric motor and then transmits to a subtractor as feedback BT the electric braking force adjusted in accordance with a speed of the electric motor. The subtractor transmits to a mechanical brake as a mechanical braking command a result obtained by subtracting the feedback BT from the required braking force BL.

16 Claims, 9 Drawing Sheets

(51) Int. Cl.
*B60T 8/72* (2006.01)
*B60T 8/52* (2006.01)
*B60T 8/58* (2006.01)

(52) U.S. Cl.
CPC .............. *B60T 8/58* (2013.01); *B60T 2201/02* (2013.01); *B60T 2250/02* (2013.01); *B60T 2270/604* (2013.01)

(58) Field of Classification Search
CPC ........... B60T 2250/02; B60T 2270/604; B60T 13/74; B60T 8/00; B60T 8/17; B60T 8/171; B60T 8/172; B60T 8/1766; B60T 8/18; B60T 8/1806; B60T 8/1837; B60T 8/261; B60T 8/30; B60T 8/32; B60T 8/3205; B60T 8/321; B60T 8/34; B60T 8/74; B60T 8/76; B60T 8/86; B60T 8/88; B60T 8/885; B60T 8/90; B61H 11/14; B60L 7/18; B60L 7/22; B60L 15/2009; B16B 13/00
USPC .......................................................... 701/70
See application file for complete search history.

(56) References Cited

U.S. PATENT DOCUMENTS

| | | |
|---|---|---|
| 2005/0200197 A1 | 9/2005 | Crombez et al. |
| 2010/0049416 A1 | 2/2010 | Harada |
| 2014/0379190 A1 | 12/2014 | Sawada |
| 2015/0019058 A1* | 1/2015 | Georgiev ................ B60L 3/108 701/22 |
| 2016/0001756 A1 | 1/2016 | Konishi |
| 2016/0031325 A1* | 2/2016 | Kim ........................ B60T 8/326 701/70 |

FOREIGN PATENT DOCUMENTS

| | | |
|---|---|---|
| GB | 2460528 A | 12/2009 |
| JP | H08-164857 A | 6/1996 |
| JP | 2015-095966 A | 5/2015 |
| WO | 2014/128820 A1 | 8/2014 |

OTHER PUBLICATIONS

International Search Report (PCT/ISA/210) dated Apr. 26, 2016, by the Japanese Patent Office as the International Searching Authority for International Application No. PCT/JP2016/052974.
Written Opinion (PCT/ISA/237) dated Apr. 26, 2016, by the Japanese Patent Office as the International Searching Authority for International Application No. PCT/JP2016/052974.
Extended European Search Report dated Dec. 19, 2018, issued by the European Patent Office in corresponding European Application No. 16889224.8. (7 pages).

* cited by examiner

BRAKE CONTROL DEVICE FOR ELECTRIC VEHICLE

TECHNICAL FIELD

The present disclosure relates to a brake control device for electric vehicle, the brake control device being mounted on a vehicle driven by an electric motor and performing blending control using both an electrical brake and a mechanical brake.

BACKGROUND ART

Electric braking force for braking an electric railway vehicle is obtained by making an electric motor operate as a generator and applying force of reverse rotation of an armature to axle shafts, the rotational force the direction of which is opposite to the rotational direction of the armature occurring in a conversion from kinetic energy of the electric railway vehicle into electrical energy. The electric braking force is not affected by a friction coefficient between a brake shoe and a wheel, the friction coefficient depending on a vehicle speed, and thus approximately constant electric braking force can be obtained over a wide range of speeds of the electric railway vehicle. The use of electric braking for the purpose of decreasing the use of mechanical braking enables great reductions in wheel maintenance and a wear amount of the brake shoe.

In blending control of vehicle braking using both electric braking and mechanical braking, a brake control device calculates a required braking force necessary for obtaining a desired deceleration, in accordance with a braking command and a weight of a vehicle. The electric motor is controlled on the basis of an electric braking command in accordance with the required braking force, and an electric braking force is generated. The brake control device controls an electropneumatic conversion valve so that a mechanical brake is used for compensating for shortfall corresponding to braking force calculated by subtracting from the required braking force electric braking force that is actually generated by the electric motor and that is calculated based on current flowing through the electric motor or a speed of the electric motor.

In the case where the speed of the vehicle is low, desired electric braking force cannot be obtained. Therefore, when the speed of the vehicle falls below a given value, control of stopping electric braking is started in order to make total braking force, which is the sum of the electric braking force and the mechanical braking force, match the required braking force, and then mechanical brake is started up. If response of the mechanical brake is slow, a delay of the start-up of the mechanical braking force causes a difference between the total braking force and the required braking force so that constant deceleration cannot be obtained. As a result, there is a problem that the above braking control device causes an uncomfortable ride in the vehicle.

Methods used for making the total braking force equal to the required braking force include a method in which fast start-up of mechanical braking force is achieved by performing precharge control, by application of very low pressure to a brake cylinder while the electric brake is in operation, to reduce a space between the brake shoe and the wheel to improve the response of the mechanical brake.

In order to make the total braking force match the required braking force, in a braking device for a vehicle disclosed in Patent Literature 1, when the vehicle speed is decreased up to a predetermined speed slightly higher than a speed at which electric braking becomes ineffective, an advanced notice signal for notification of loss of effect of electric braking is transmitted from speed control means to precharge control means included in a brake operating device, and supplemental air braking force is applied to a brake cylinder by the air braking device.

CITATION LIST

Patent Literature

Patent Literature 1: Unexamined Japanese Patent Application Kokai Publication No. H08-164857

SUMMARY OF INVENTION

Technical Problem

A pressure of about 40 kPa or less is usually applied to the brake cylinder in the precharge control. However, tolerance allowed in pressure control of the brake cylinder is about 20 kPa. Therefore, the brake shoe may come into contact with the wheel in the precharge control, which worsens maintainability of the wheel and increases an amount of wear of the brake shoe.

There is a problem in that the braking device for a vehicle disclosed in Patent Literature 1 requires a structure in which each of an electric power converter and a braking controller is provided with an interface for receiving and transmitting an advanced notice signal for notification of loss of effectiveness of electric braking, and thus there is a problem in that the braking device disclosed in Patent Literature 1 has a complicated structure.

In order to solve the aforementioned problem, an objective of the present disclosure is to, via a brake control device of simplified structure, obtain the total braking force equal to the required braking force in the case where the vehicle speed is low.

Solution to Problem

In order to achieve the aforementioned objective, a brake control device for electric vehicle of the present disclosure, which is to be mounted on a vehicle driven by an electric motor, includes: a required braking force calculator; an electric braking force calculator; and an adjuster. The required braking force calculator calculates a required braking force on the basis of: a deceleration of a vehicle included in a braking instruction; and a weight of the vehicle, the required braking force being a braking force required for obtaining the deceleration. The electric braking force calculator calculates electric braking force generated by operation of the electric motor. The adjuster: adjusts electric braking force calculated by the electric braking force calculator to a smaller value when the speed of the electric motor is equal to or smaller than a threshold; and outputs the adjusted electric braking force.

Advantageous Effects of Invention

According to the present disclosure, the electric braking force generated by the electric motor is adjusted to a smaller value when the speed of the electric motor is equal to or smaller than the threshold, to use the adjusted electric braking force as feedback of electric braking force, and the mechanical brake is controlled based on a mechanical braking command depending on the feedback of electric braking force, and thus, by use of a simplified structure, total braking force equal to required braking force can be obtained in the case where a vehicle speed is low.

DESCRIPTION OF EMBODIMENTS

An embodiment of the present disclosure is described in detail hereinafter with reference to drawings. Components that are the same or equivalent are assigned the same reference signs throughout the drawings.

Figure 1:
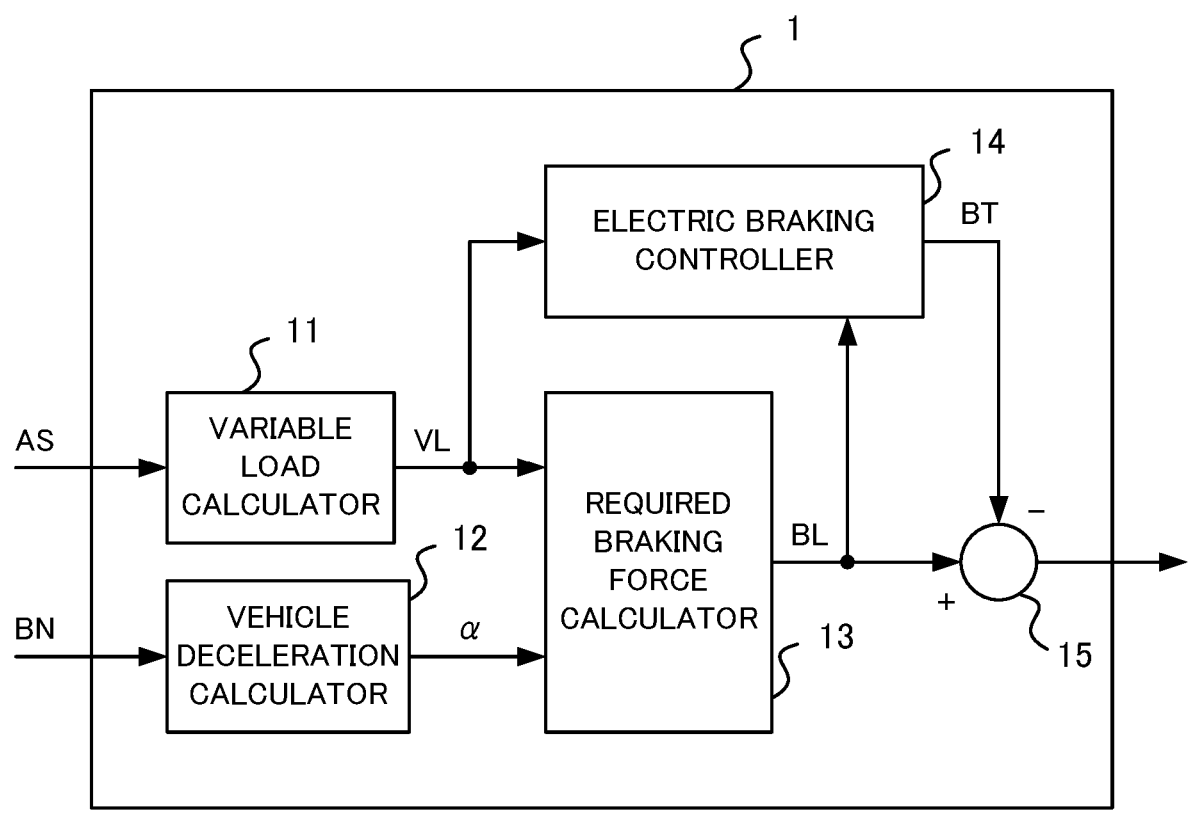
FIG. 1 is a block diagram illustrating an example configuration of a brake control device according to an embodiment of the present disclosure.

FIG. 1 is a block diagram illustrating an example configuration of a brake control device according to the embodiment of the present disclosure. A brake control device 1 is mounted on an electric railway vehicle that is hereinafter referred to as "electric vehicle". The brake control device 1 includes: a variable load calculator 11 to calculate a variable load command VL on the basis of air suspension pressure (AS pressure) from an air suspension of a bogie and a predetermined table; a vehicle deceleration calculator 12 to calculate a required vehicle deceleration α on the basis of a brake notch command BN and a predetermined table; a required braking force calculator 13 to calculate a required braking force BL based on the variable load command VL and the vehicle deceleration α, the required braking force BL being a braking force required for obtaining the vehicle deceleration α; an electric braking controller 14 to output an electric braking pattern according to the required braking force BL and to calculate and output feedback BT of electric braking force (which is hereinafter referred to as "feedback"); and a subtractor 15 to output, to a mechanical brake, a result obtained by subtracting the feedback BT from the required braking force BL, the result obtained by the subtraction being used as a mechanical braking command. The subtractor 15 operates as a mechanical braking controller.

Figure 2:
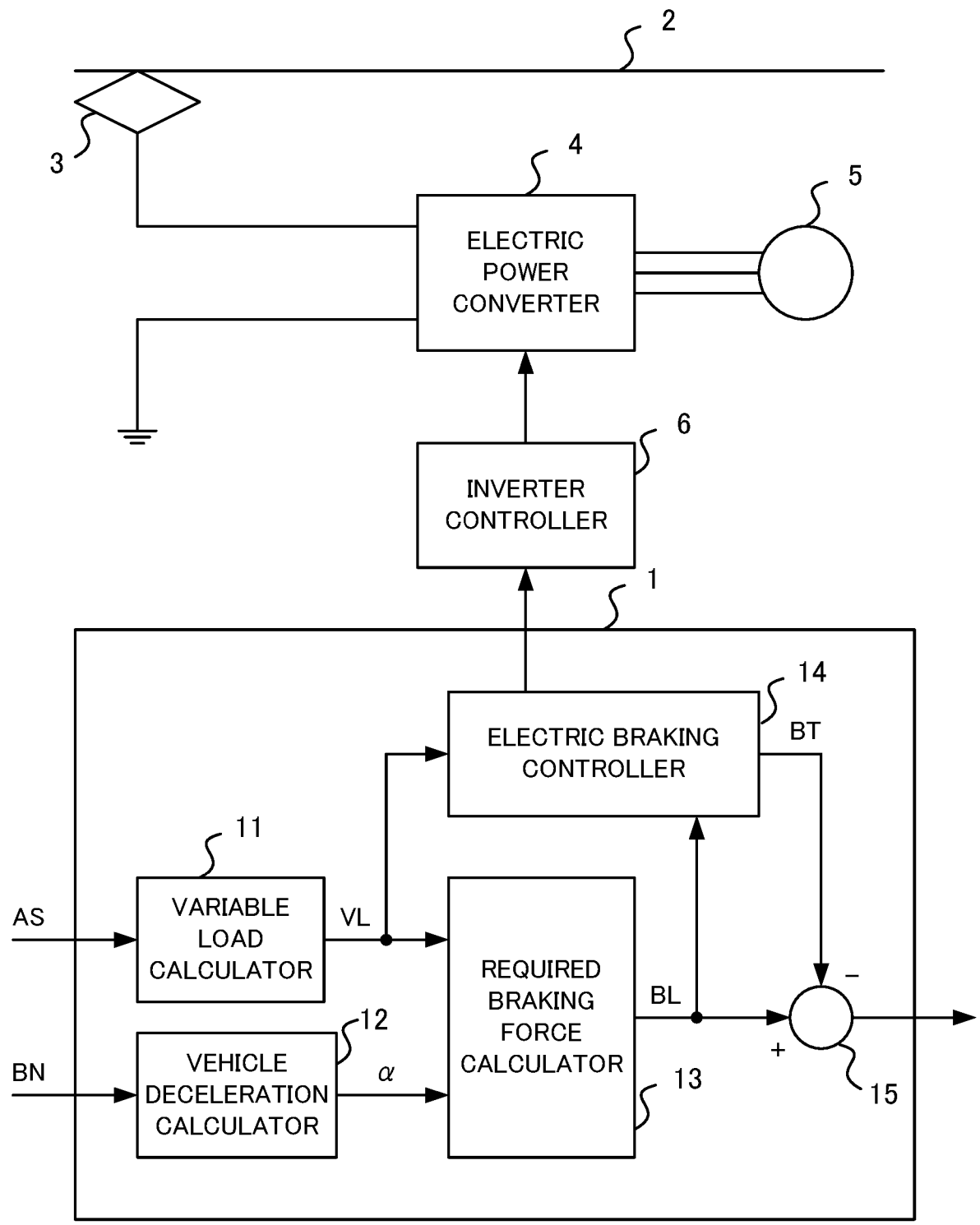
FIG. 2 is a drawing illustrating an example of how to mount the brake control device according to the embodiment on an electric railway vehicle.

FIG. 2 is a drawing illustrating an example of how to mount the brake control device according to the embodiment on an electric railway vehicle. An inverter controller 6 controls a switching element included in an electric power converter 4. The inverter controller 6 executes pulse width modulation (PWM) control. The electric power converter 4 is a commonly used inverter circuit. Silicon (Si) may be used for the switching element. Alternatively, a compound semiconductor such as silicon carbide (SiC) or gallium nitride (GaN) may be used for the switching element. By control of the electric power converter 4 by the inverter controller 6, the electric power converter 4 converts electric power obtained from an overhead line 2 via an electric power collector 3 to supply the converted electric power to an electric motor 5, and thus driving power for the electric vehicle can be obtained. Also, the inverter controller 6 controls the electric power converter 4 in accordance with an electric braking pattern transmitted from the electric braking controller 14, and thus the electric motor 5 operates as an electric power generator, and electric braking force can be obtained. The number of electric motors 5 to which the electric power converter 4 supplies electric power is optional. Any electric motor, such as an induction motor or a synchronous motor, may be used as the electric motor 5.

The brake control device 1 starts up the mechanical brake before a start of control for stopping electric braking due to decrease in a vehicle speed, and thus the brake control device 1 makes a total braking force match the required braking force, the total braking force being the sum of the electric braking force and a mechanical braking force. The phrase, "making the total braking force match the required braking force", means "keeping a difference between the total braking force and the required braking force within a certain range in which such a difference does not cause uncomfortable ride in the vehicle".

Operation of each component of the brake control device 1 is described below. The variable load calculator 11 calculates a variable load command VL on the basis of AS pressure and a predetermined table and then transmits the variable load command VL to the required braking calculator 13 and the electric braking controller 14. The vehicle deceleration calculator 12 calculates vehicle deceleration α on the basis of a brake notch command BN and a predetermined table and then transmits the vehicle deceleration α to the required braking force calculator 13. The required braking force calculator 13 calculates required braking force BL by multiplying a load indicated by the variable load command VL and the vehicle deceleration α together, and then transmits the required braking force BL to the electric braking controller 14 and the subtractor 15.

The electric braking controller 14 calculates an electric braking pattern in accordance with the required braking force BL and then transmits the electric braking pattern to the inverter controller 6. The electric braking controller 14 calculates an electric braking force generated by operation of the electric motor 5 on the basis of current flowing through the electric motor 5 and then transmits, to the subtractor 15 as a feedback BT, the electric braking force adjusted in accordance with a speed of the electric motor 5. The subtractor 15 transmits, as a mechanical braking command to a mechanical brake, a result obtained by subtracting the feedback BT from the required braking force BL.

Figure 3:
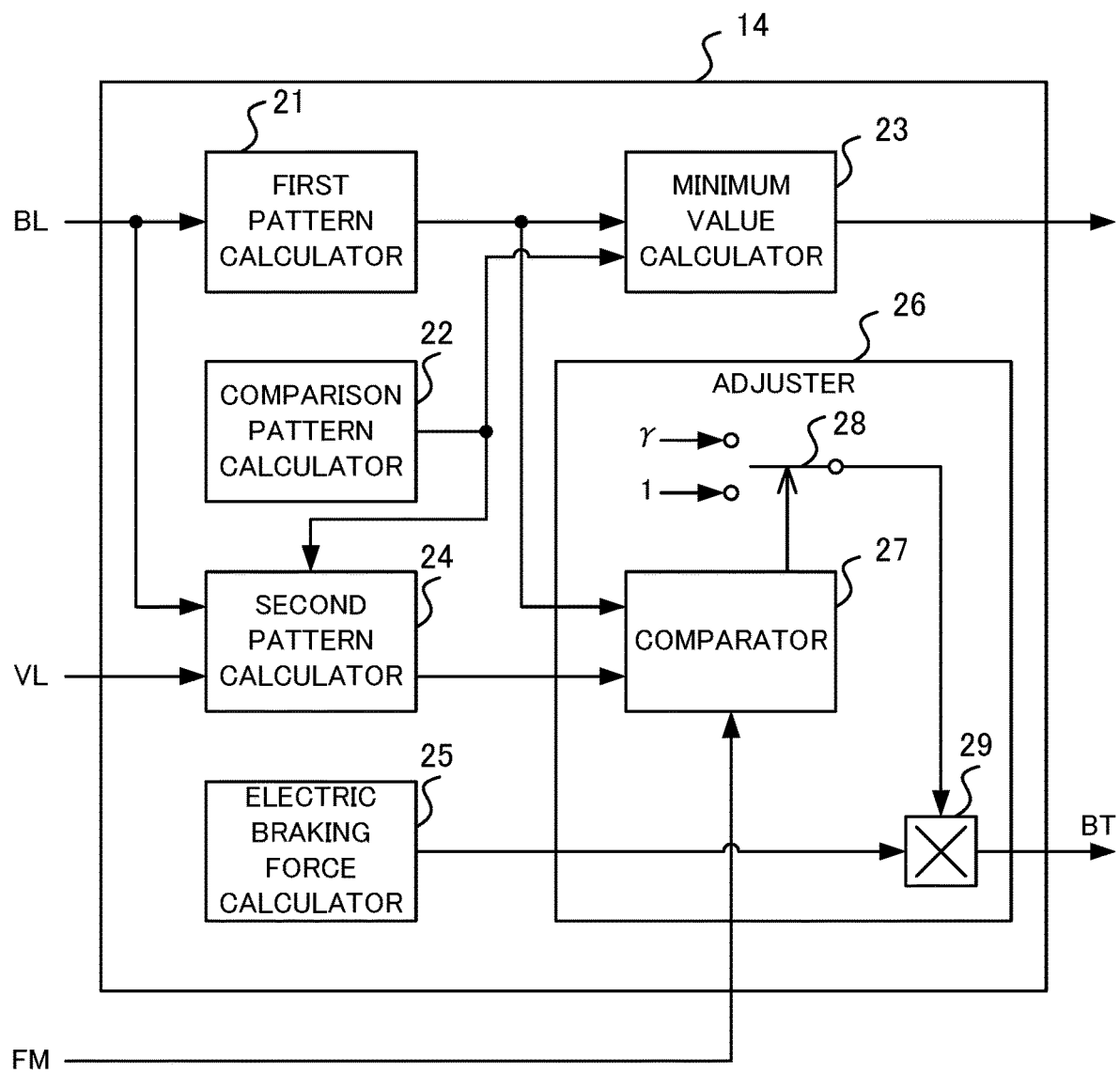
FIG. 3 is a block diagram illustrating an example configuration of an electric braking controller according to the embodiment.

FIG. 3 is a block diagram illustrating an example configuration of an electric braking controller according to the embodiment. The electric braking controller 14 includes: a first pattern calculator 21 to calculate a first pattern indicating a relation between a speed of the electric motor 5 and the electric braking force in accordance with the required braking force BL; a comparison pattern calculator 22 to output a pattern for comparison indicating a relation between a predetermined speed of the electric motor 5 and the electric braking force; a minimum value calculator 23 to calculate an electric braking pattern on the basis of the first pattern and the pattern for comparison; a second pattern calculator 24 to calculate a second pattern indicating a relation between the speed of the electric motor 5 and the electric braking force on the basis of the required braking force BL, the variable load command VL and the first pattern; an electric braking force calculator 25 to calculate the electric braking force generated by operation of the electric motor 5; and an adjuster 26 to adjust the electric braking force in accordance with the first pattern, the second pattern and a speed FM of the electric motor 5 and output the adjusted electric braking force as the feedback BT.

The adjuster 26 includes: a switch 28, a comparator 27 to perform switching operation using the switch 28 in accordance with the speed FM of the electric motor 5, the first pattern and the second pattern; and a multiplier 29 to output, as the feedback BT, a result obtained by multiplying the electric braking force calculated by the electric braking force calculator 25 by 1 or γ inputted via the switch 28.

Figure 4:
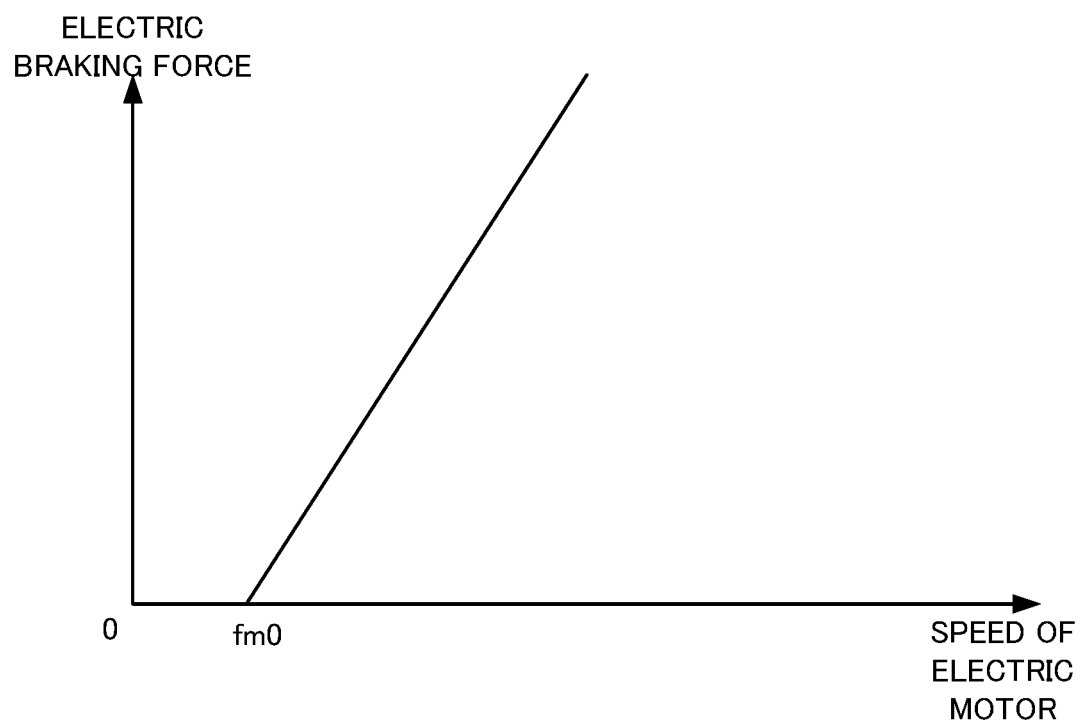
FIG. 4 is a chart illustrating an example of a pattern for comparison in the embodiment.

Calculation of the feedback BT by the electric braking controller 14 is next described. The comparison pattern calculator 22 outputs a pattern for comparison indicating a change in electric braking force in a range of speeds of the electric motor 5 in which electric braking becomes ineffective due to decrease in a speed of the electric motor 5. FIG. 4 is a chart illustrating an example of a pattern for comparison in the embodiment. In the chart illustrated in FIG. 4, the horizontal axis indicates the speed of the electric motor 5 and the vertical axis indicates the electric braking force. The speed of the electric motor 5 is expressed in "Hz" units, and the electric braking force is expressed in "Nm" units. Decrease in a speed of the electric motor 5 results in decrease in electric braking force, and, in FIG. 4, electric braking becomes completely ineffective when the speed of the electric motor 5 reaches fm0. That is to say, electric braking force cannot be obtained at all when the speed of the electric motor 5 is equal to or lower than fm0. The pattern for comparison is expressed by formula (1) described below. The symbols, "a" and "b" in formula (1) described below are constant numbers and are determined in accordance with characteristics of the electric motor 5.

[Formula 1]

$$T = a \cdot FM + b \quad (1)$$

The minimum value calculator 23 outputs to the inverter controller 6 the electric braking pattern that is found using the first pattern and the pattern for comparison, includes minimum values of electric braking force for speeds of the electric motor 5, and represents a relation between a speed of the electric motor 5 and the electric braking force. The inverter controller 6 controls the electric power converter 4 in accordance with the electric braking pattern calculated with the first pattern and the pattern for comparison, and thus control for stopping electric braking can be started in accordance with the time at which the electric braking starts becoming ineffective.

Figure 5:
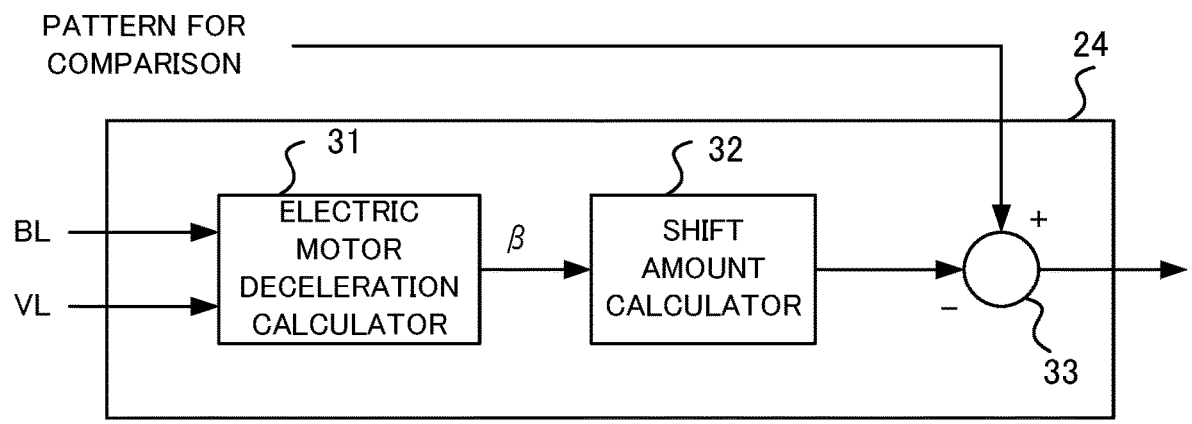
FIG. 5 is a block diagram illustrating an example configuration of a second pattern calculator according to the embodiment.

FIG. 5 is a block diagram illustrating an example configuration of a second pattern calculator according to the embodiment. The second pattern calculator 24 includes: an electric motor deceleration calculator 31 to calculate a deceleration β of the electric motor based on the required braking force BL and the variable load command VL; a shift amount calculator 32 to calculate a shift amount for the electric braking force in accordance with the deceleration β of the electric motor; and a subtractor 33 to subtract the shift amount from the pattern for comparison. The second pattern calculator 24 outputs as the second pattern a result obtained by subtracting the shift amount from the pattern for comparison.

The required braking force BL inputted to the electric motor deceleration calculator 31 is expressed by formula (2) described below. The symbol "c" in formula (2) is a conversion constant. The required braking force BL is proportional to the product of the variable load command VL and the vehicle deceleration α. When the vehicle deceleration α is expressed by the formula α=k·β, where the symbol "k" denotes a conversion constant, formula (3) described below is obtained. Formula (4) described below is obtained by transformation of formula (3). By setting K=1/(c·k), formula (5) described below is obtained from formula (4).

[Formula 2]

$$BL = c \cdot VL \cdot \alpha \quad (2)$$

[Formula 3]

$$BL = c \cdot VL \cdot k \cdot \beta \quad (3)$$

[Formula 4]

$$\beta = BL/(c \cdot k \cdot VL) \quad (4)$$

[Formula 5]

$$\beta = K \cdot BL/VL \quad (5)$$

The electric motor deceleration calculator 31 calculates the deceleration β of the electric motor from the required braking force BL and the variable load command VL using formula (5) and then transmits the deceleration β of the electric motor to the shift amount calculator 32.

The time required for a BC pressure to change from zero to a pressure corresponding to a precharge pressure is assumed to be t (seconds), where the BC pressure is the pressure in the brake cylinder of the mechanical brake. The precharge pressure is a minimum pressure required for starting up the mechanical brake without delay when the electric braking starts becoming ineffective. The precharge pressure does not produce the mechanical braking force. The precharge pressure and time t are determined in accordance with characteristics of the mechanical brake. An electric motor speed variation ΔFM that is an amount of the change in the speed of the electric motor 5 during time t (seconds) is expressed by formula (6) described below.

[Formula 6]

$$\Delta FM = \beta \cdot t \quad (6)$$

By starting up the mechanical brake t (seconds) earlier than the time at which the electric braking starts becoming ineffective, the total braking force can be made to match the required braking force even at low vehicle speed. The electric braking controller 14 calculates the feedback BT based on the first pattern and the second pattern calculated by shifting the pattern for comparison illustrated in FIG. 4 by ΔFM in the direction in which the variable on the axis describing a speed of the electric motor 5 increases. When electric braking force indicated by the second pattern is expressed by a symbol "T'", this electric braking force T' is expressed by formula (7) described below. A shift amount S is expressed by formula (8) described below.

[Formula 7]

$$\begin{aligned} T' &= a \cdot (FM - \Delta FM) + b \\ &= a \cdot FM + b - a \cdot \Delta FM \\ &= a \cdot FM + b - (a \cdot \beta \cdot t) \\ &= T - (a \cdot t \cdot \beta) \end{aligned} \quad (7)$$

[Formula 8]

$$S = \alpha \cdot t \cdot \beta \quad (8)$$

Figure 6:
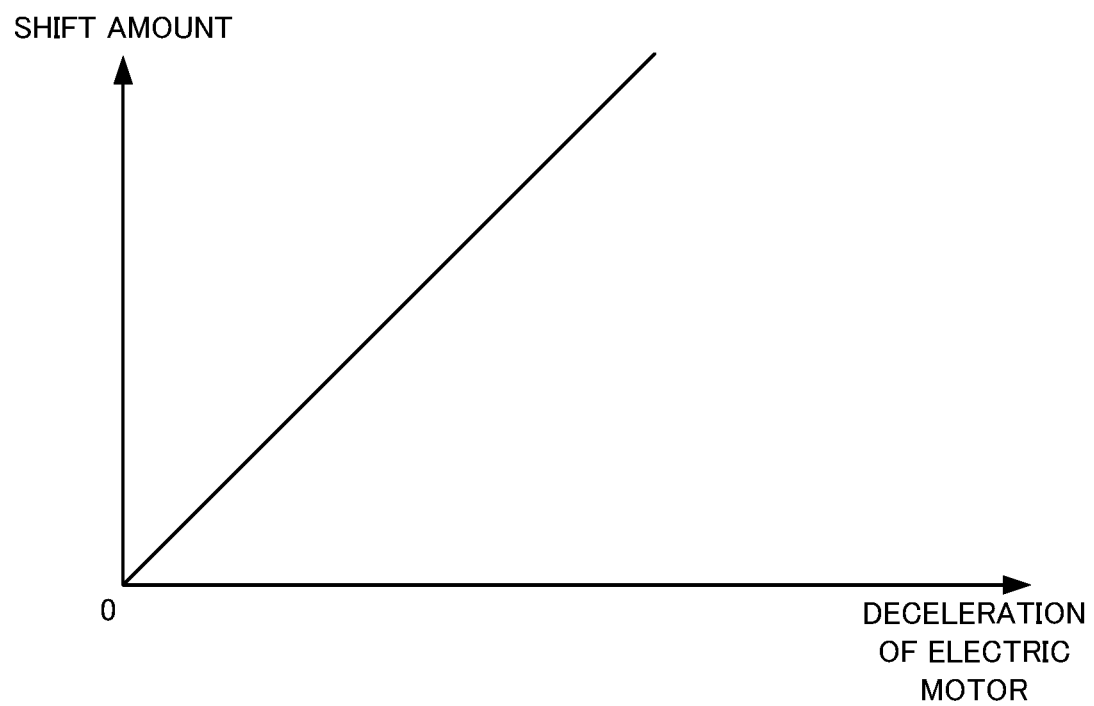
FIG. 6 is a chart illustrating a relation between deceleration of an electric motor and a shift amount in the embodiment.

FIG. 6 is a chart illustrating a relation between the deceleration of the electric motor and the shift amount in the embodiment. In the chart illustrated in FIG. 6, the horizontal axis indicates deceleration of the electric motor 5, and the vertical axis indicates the shift amount. The deceleration of the electric motor 5 is expressed in "Hz/s" units, and the shift amount is expressed in Nm units. The shift amount calculator 32 calculates the shift amount S using the electric motor deceleration β, as illustrated in FIG. 6 and described in formula (8). The subtractor 33 subtracts the shift amount S from the pattern for comparison illustrated in FIG. 4 and outputs a result of the subtraction. The second pattern calculator 24 outputs the output from the subtractor 33 as the second pattern.

The electric braking force calculator 25 may find the electric braking force by calculating torque generated by the electric motor 5 based on current flowing in the electric motor 5 or by sensing the braking force generated by the electric motor 5 via a brake torque sensor. The comparator 27 included in the adjuster 26 acquires the electric motor speed FM that is the speed of the electric motor 5 from a non-illustrated speed sensor attached to the electric motor 5. A first braking force that is the electric braking force calculated from the first pattern on the basis of the electric motor speed FM is compared with a second braking force that is the electric braking force calculated from the second pattern on the basis of the electric motor speed FM. When the first braking force is larger than the second braking force, the comparator 27 controls the switch 28 so that "1" is inputted into the multiplier 29. When the first braking force is equal to or smaller than the second braking force, the comparator 27 controls the switch 28 so that "γ" is inputted into the multiplier 29. The value γ is a freely selected positive number less than 1 and is determined by characteristics of the mechanical brake including time required for starting up the mechanical brake.

When the first braking force is equal to or smaller than the second braking force, the electric braking controller 14 outputs as feedback BT a calculation result obtained by multiplying the electric braking force by γ having a value less than 1. The mechanical brake is controlled based on the mechanical braking command calculated based on electric braking force smaller than actually-occurring electric braking force, and thus the mechanical brake starts up before the electric braking force starts becoming ineffective, and the BC pressure is set to the precharge pressure.

Figure 7:
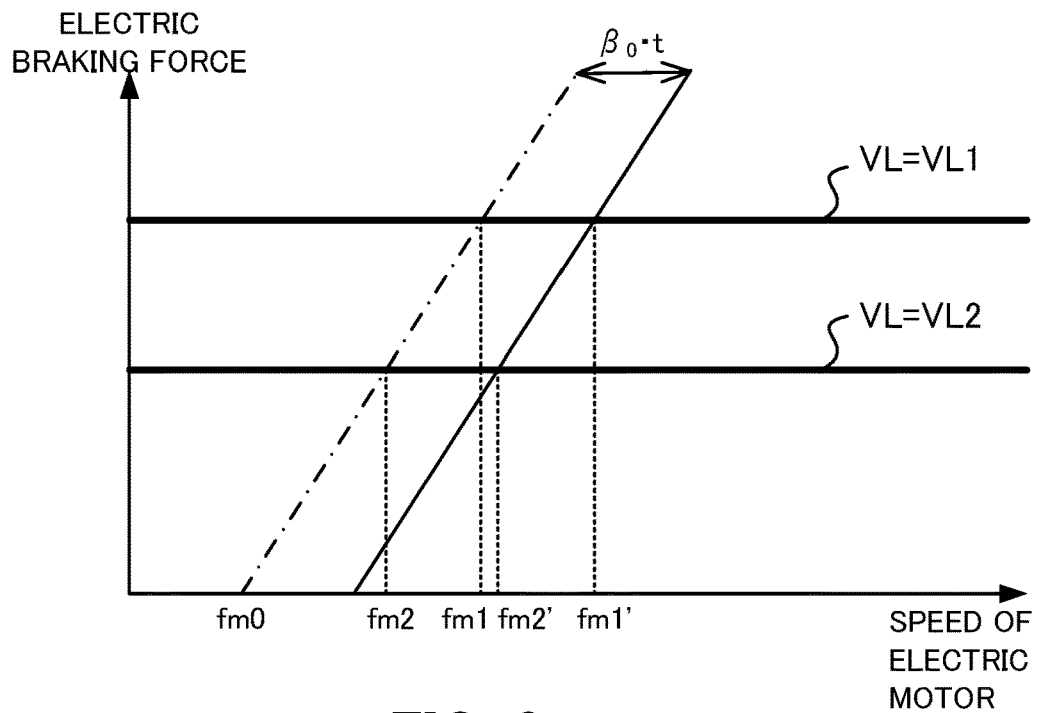
FIG. 7 is a chart illustrating the timing of a start-up of mechanical brake in the embodiment.

FIG. 7 is a chart illustrating the timing of a start-up of the mechanical brake in the embodiment. In the chart illustrated in FIG. 7, the horizontal axis indicates speed of the electric motor 5, and the vertical axis indicates electric braking force. The speed of the electric motor 5 is expressed in Hz units, and the electric braking force is expressed in Nm units. Thick solid lines illustrated in FIG. 7 indicate a first pattern outputted by the first pattern calculator 21 in the case where the variable load command VL is equal to VL1 and a first pattern outputted by the first pattern calculator 21 in the case where the variable load command VL is equal to VL2. A brake notch command BN in the case where VL=VL1 is equal to a brake notch command BN in the case where VL=VL2. In FIG. 7, the dot-and-dash line indicates a pattern for comparison outputted by the comparison pattern calculator 22 and the narrow solid line indicates a second pattern outputted by the second pattern calculator 24. When deceleration of the electric motor is expressed by the symbol, "$\beta_0$", a second pattern is found by subtracting a shift amount, "$a \cdot t \cdot \beta_0$", from a first pattern. That is to say, the second pattern is obtained by shifting the first pattern by $\beta_0 \cdot t$ in the direction of increasing speed of the electric motor 5.

In the case where VL=VL1, the electric braking starts becoming ineffective when the speed of the electric motor 5 reaches fm1, and the electric brake becomes completely ineffective when the speed of the electric motor 5 reaches fm0. When a speed of the electric motor 5 is larger than fm1' that is larger than fm1, the electric braking controller 14 outputs as feedback BT the electric braking force calculated by the electric braking force calculator 25, and a mechanical braking command calculated based on the feedback BT is transmitted to the mechanical brake. When a speed of the electric motor 5 is equal to or smaller than fm1', the electric braking controller 14 outputs as the feedback BT a calculation result obtained by multiplying together the electric braking force calculated by the electric braking force calculator 25 and γ. That is to say, when the speed of the electric motor 5 becomes fm1', the mechanical brake is started up.

In the case where VL=VL2, electric braking starts becoming ineffective when the speed of the electric motor 5 reaches fm2, and the electric braking becomes completely ineffective when the speed of the electric motor 5 reaches fm0. When the speed of the electric motor 5 is larger than fm2' that is larger than fm2, the electric braking controller 14 outputs as feedback BT electric braking force calculated by the electric braking force calculator 25, and a mechanical braking command calculated based on the feedback BT is transmitted to the mechanical brake. When a speed of the electric motor 5 is equal to or smaller than fm2', the electric braking controller 14 outputs as feedback BT a calculation result obtained by multiplying together the electric braking force calculated by the electric braking force calculator 25 and γ. That is to say, when the speed of the electric motor 5 becomes fm2', the mechanical brake is started up.

Both the difference between fm1 and fm1' and the difference between fm2 and fm2' are $\beta_0 \cdot t$. That is to say, independently of variable load commands VL, the mechanical brake is started up t (seconds) earlier than the time at which the electric braking starts becoming ineffective, and BC pressure reaches the precharge pressure at the time at which the electric braking starts becoming ineffective.

Figure 8:
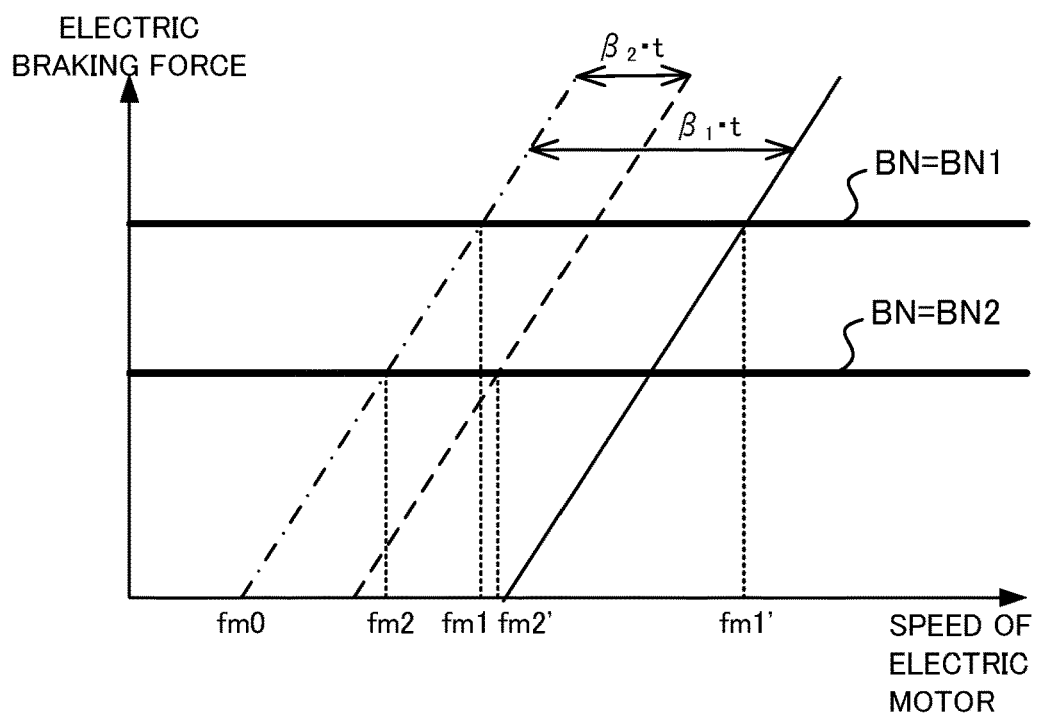
FIG. 8 is a chart illustrating the timing of a start-up of mechanical brake in the embodiment.

FIG. 8 is a chart illustrating the timing of a start-up of the mechanical brake in the embodiment. FIG. 8 is to be regarded similarly to FIG. 7. Thick solid lines illustrated in FIG. 8 indicate a first pattern outputted by the first pattern calculator 21 in the case where the brake notch command BN is equal to BN1 and a first pattern outputted by the first pattern calculator 21 in the case where the brake notch command BN is equal to BN2. In FIG. 8, the dot-and-dash line indicates a pattern for comparison outputted by the comparison pattern calculator 22, the narrow solid line indicates a second pattern outputted by the second pattern calculator 24 in the case where BN=BN1 and the dashed line indicates a second pattern outputted by the second pattern calculator 24 in the case where BN=BN2.

In the case where BN=BN1, when deceleration of the electric motor 5 is expressed by the symbol "$\beta_1$", the second pattern is calculated by subtracting a shift amount $a \cdot t \cdot \beta_1$ from the first pattern. That is to say, the second pattern is obtained by shifting the first pattern by $\beta_1 \cdot t$ in the direction of increasing speed of the electric motor 5. The electric braking starts becoming ineffective when the speed of the electric motor 5 reaches fm1, and the electric braking completely becomes ineffective when the speed of the electric motor 5 reaches fm0. When a speed of the electric motor 5 is larger than fm1', the electric braking controller 14 outputs as feedback BT the electric braking force calculated by the electric braking force calculator 25, and a mechanical braking command calculated based on the feedback BT is transmitted to the mechanical brake. When a speed of the electric motor 5 is equal to or smaller than fm1', the electric braking controller 14 outputs as feedback BT a calculation result obtained by multiplying together the electric braking force calculated by the electric braking force calculator 25 and $\gamma$. That is to say, when the speed of the electric motor 5 becomes fm1', the mechanical brake is started up.

In the case where BN=BN2, when deceleration of the electric motor 5 is expressed by the symbol "$\beta_2$", a second pattern is calculated by subtracting a shift amount $a \cdot t \cdot \beta_2$ from the first pattern. That is to say, the second pattern is obtained by shifting the first pattern by $\beta_2 \cdot t$ in the direction of increasing speed of the electric motor 5. Electric braking starts becoming ineffective when the speed of the electric motor 5 reaches fm2, and, the electric braking becomes completely ineffective when the speed of the electric motor 5 reaches fm0. When a speed of the electric motor 5 is larger than fm2', the electric braking controller 14 outputs as feedback BT the electric braking force calculated by the electric braking force calculator 25, and a mechanical braking command calculated based on the feedback BT is transmitted to the mechanical brake. When a speed of the electric motor 5 is equal to or smaller than fm2', the electric braking controller 14 outputs as feedback BT a calculation result obtained by multiplying together the electric braking force calculated by the electric braking force calculator 25 and $\gamma$. That is to say, when the speed of the electric motor 5 becomes fm2', the mechanical brake is started up.

In the case where the speed of the electric motor 5 is $\beta_1$, the difference between fm1 and fm1' is $\beta_2 \cdot t$, and in the case where the speed of the electric motor 5 is $\beta_2$, the difference between fm2 and fm2' is $\beta_2 \cdot t$. That is to say, independently of brake notch, the mechanical brake is started up t (seconds) earlier than the time at which the electric braking starts becoming ineffective, and BC pressure reaches the precharge pressure at the time at which the electric braking starts becoming ineffective.

Figure 9:
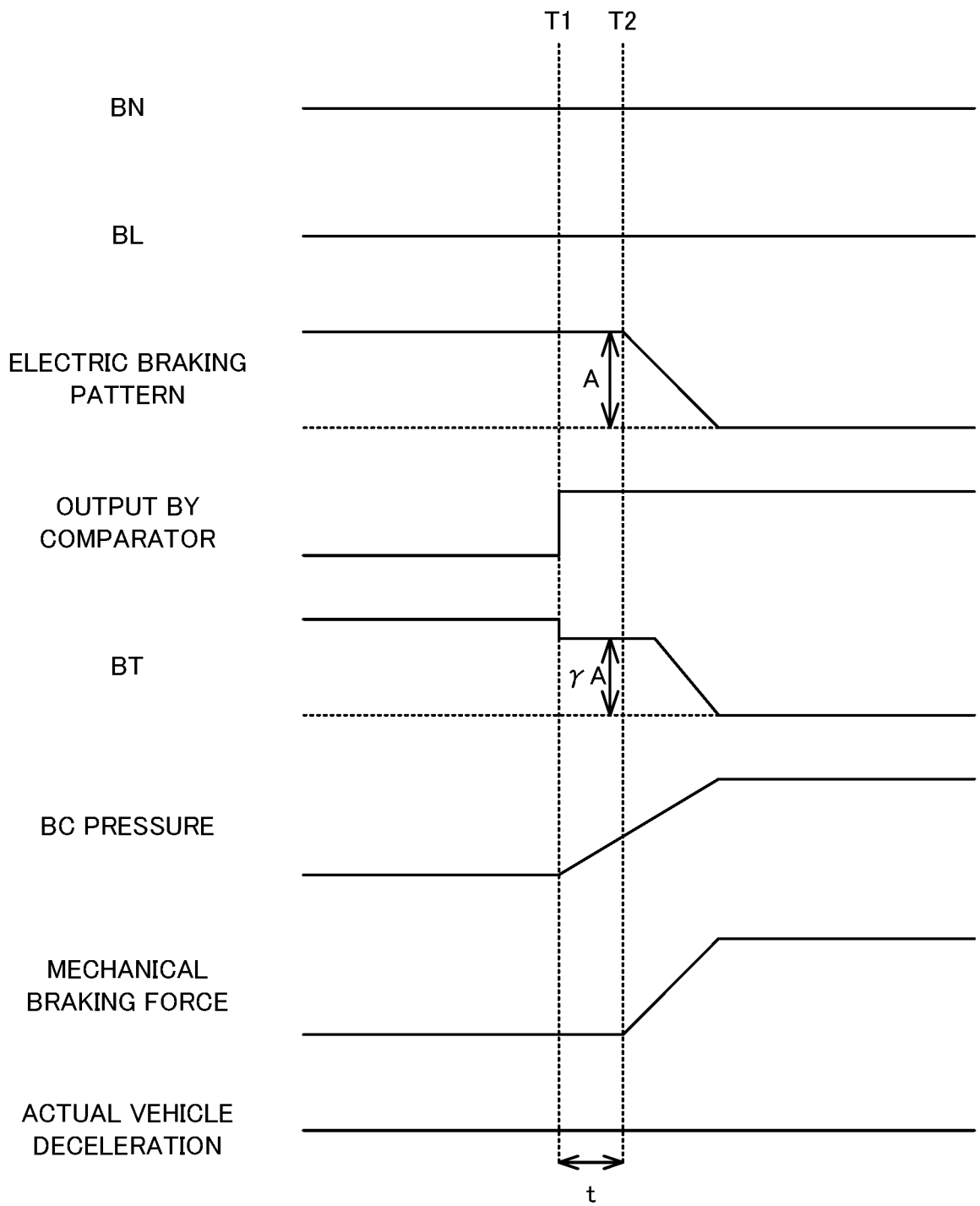
FIG. 9 is a timing chart illustrating an example of adjustment of electric braking force in the embodiment.

FIG. 9 is a timing chart illustrating an example of adjustment of electric braking force in the embodiment. In FIG. 9, the brake notch is steady. In order to obtain a steady required braking force BL, the electric braking controller 14 outputs a steady electric braking pattern at the start of braking control. The electric braking controller 14 outputs an electric braking pattern decreasing at a constant rate after time T2 in accordance with the loss of effectiveness of the electric braking in the case of low speed running. The comparator 27 determines until time T1 that the first braking force is larger than the second braking force, and then the comparator 27 outputs a signal of a low level (L-level). When the signal outputted by the comparator 27 is of the L-level, the value "1" is inputted into the multiplier 29 via the switch 28. The comparator 27 determines at time T1 that the first braking force is equal to or smaller than the second braking force, and then the comparator 27 outputs a signal of a high level (H-level). When the signal outputted by the comparator 27 is of the H-level, the value "$\gamma$" is inputted into the multiplier 29 via the switch 28.

When the magnitude of electric braking force outputted by the electric braking force calculator 25 is expressed by the symbol "A", the feedback BT outputted by the electric braking controller 14 at time T1 is $\gamma$A. Occurrence of a difference between required braking force BL and the feedback BT at time T1 results in start-up of the mechanical brake, and thus the BC pressure starts increasing. The BC pressure becomes the precharge pressure at time T2, and thus mechanical braking force starts increasing. Since the mechanical braking force starts increasing at time T2 at which the electric braking force starts decreasing, an actual deceleration of the vehicle can be kept constant.

When the speed of the electric motor 5 is equal to or smaller than a threshold, the mechanical brake is started up before the start of control for stopping electric braking by adjusting feedback BT to a value smaller than actual electric braking force, and thus mechanical braking force can be increased without delay from the start of control for stopping electric braking. As a result, total braking force equal to the required braking force can be obtained even though the speed of the electric motor 5 is low. Also, a configuration of a conventional brake control device may be used as that of a brake control device 1 other than the electric braking controller 14 for adjusting feedback BT.

As described above, in the brake control device 1 according to the present embodiment, electric braking force calculated by the electric braking force calculator 25 is adjusted to a smaller value and the adjusted electric braking force is used as feedback BT when the first braking force is equal to or smaller than the second braking force, and then the mechanical brake is controlled by a mechanical braking command calculated based on the feedback BT, thereby total braking force equal to required braking force can be obtained with a simple structure that does not requires an interface for receiving and transmitting an advanced notice signal for notifying loss of an effect of electric braking without deterioration of ride quality in the case of a low vehicle speed.

Figure 10:
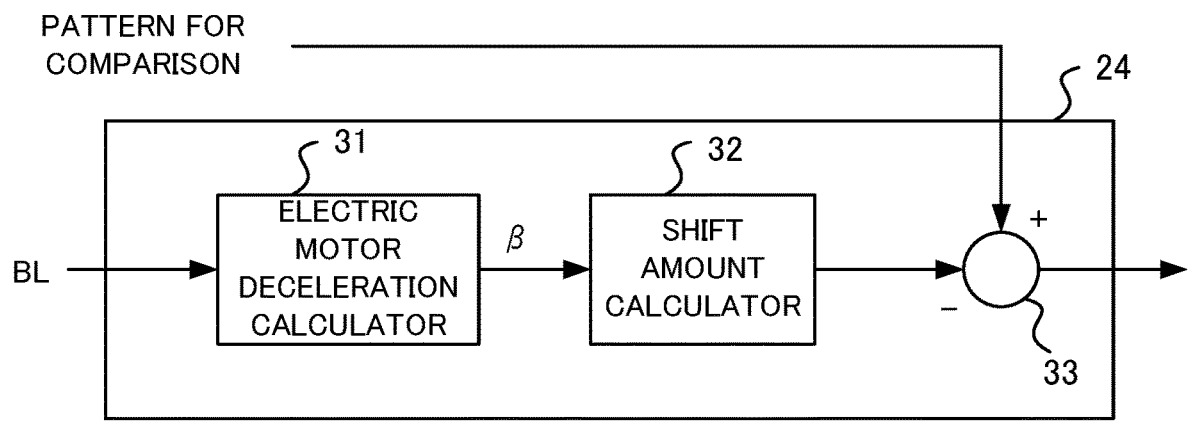
FIG. 10 is a block diagram illustrating another example configuration of the second pattern calculator according to the embodiment.

Embodiments according to the present disclosure are not limited to the aforementioned embodiment. FIG. 10 is a block diagram illustrating another example configuration of the second pattern calculator according to the embodiment. As illustrated in FIG. 10, the electric motor deceleration calculator 31 may calculate deceleration $\beta$ of the electric motor based on only the required braking force BL. Also, the method for calculating the timing of performing switching operation using the switch 28 is not limited to that of the above-described example.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Brake control device
2 Overhead line

3 Electric power collector
4 Electric power converter
5 Electric motor
6 Inverter controller
11 Variable load calculator
12 Vehicle deceleration calculator
13 Required braking force calculator
14 Electric braking controller
15 Subtractor
21 First pattern calculator
22 Comparison pattern calculator
23 Minimum value calculator
24 Second pattern calculator
25 Electric braking force calculator
26 Adjuster
27 Comparator
28 Switch
29 Multiplier
31 Electric motor deceleration calculator
32 Shift amount calculator
33 Subtractor

The invention claimed is:

1. A brake control device for an electric vehicle driven by an electric motor, the brake control device for the electric vehicle comprising:
   a required braking force calculator to calculate a required braking force based on a deceleration of the vehicle included in a braking instruction and a weight of the vehicle, the required braking force being a braking force required for obtaining the deceleration;
   an electric braking force calculator to calculate an electric braking force generated by operation of the electric motor; and
   an adjuster to
      adjust the electric braking force calculated by the electric braking force calculator to a smaller value when the speed of the electric motor is equal to or smaller than a threshold, and output the adjusted electric braking force.

2. The brake control device for an electric vehicle according to claim 1, wherein
   (i) the adjuster outputs the electric braking force calculated by the electric braking force calculator, when a first braking force calculated from a first formula is larger than a second braking force calculated from a second formula, wherein the first formula comprises: a relationship between the speed of the electric motor and the electric braking force required to obtain a required braking force, and
   (ii) the second formula comprises: when the speed of the electric motor is such that the electric braking force alone does not obtain the deceleration due to a decrease in a speed of the electric motor, a formula obtained by subtracting from each value of the electric braking force a fixed amount based on a deceleration of the electric motor calculated based on the required braking force and a load of the vehicle; and
   adjusts, to a smaller value, the electric braking force calculated by the electric braking force calculator and then outputs the adjusted electric braking force when the first braking force is equal to or smaller than the second braking force.

3. The brake control device for an electric vehicle according to claim 1, wherein
   the adjuster outputs the electric braking force calculated by the electric braking force calculator when the speed of the electric motor is larger than the threshold.

4. The brake control device for an electric vehicle according to claim 3, further comprising;
   a mechanical braking controller to calculate a mechanical braking command by subtracting from the required braking force the electric braking force outputted by the adjuster, and to transmit the calculated mechanical braking command to a mechanical brake.

5. The brake control device for an electric vehicle according to claim 4, further comprising;
   a pattern calculator to calculate a pattern of electric braking used for control of the electric motor according to the required braking force, and to output the calculated pattern.

6. The brake control device for an electric vehicle according to claim 5, wherein
   the adjuster outputs the electric braking force calculated by the electric braking force calculator, when a first braking force calculated from a first formula is lamer than a second braking force calculated from a second formula, wherein
   (i) the first formula comprises: a relationship between the speed of the electric motor and the electric braking force required to obtain a required braking force, and
   (ii) the second formula comprises: when the speed of the electric motor is such that the electric braking force alone does not obtain the declaration due to a decrease in a speed of the electric motor, a formula obtained by subtracting from each value of the electric braking force a fixed amount based on a deceleration of the electric motor calculated based on the required braking force and a load of the vehicle; and
   adjusts, to a smaller value, the electric braking force calculated by the electric braking force calculator and then outputs the adjusted electric braking force when the first braking force is equal to or smaller than the second braking force.

7. The brake control device for an electric vehicle according to claim 4, wherein
   the adjuster outputs the electric braking force calculated by the electric braking force calculator, when a first braking force calculated from a first formula is lamer than a second braking force calculated from a second formula, wherein
   (i) the first formula comprises: a relationship between the speed of the electric motor and the electric braking force required to obtain a required braking force, and
   (ii) the second formula comprises: when the speed of the electric motor is such that the electric braking force alone does not obtain the deceleration due to a decrease in a speed of the electric motor, a formula obtained by subtracting from each value of the electric braking force a fixed amount based on a deceleration of the electric motor calculated based on the required braking force and a load of the vehicle; and
   adjusts, to a smaller value, the electric braking force calculated by the electric braking force calculator and then outputs the adjusted electric braking force when the first braking force is equal to or smaller than the second braking force.

8. The brake control device for an electric vehicle according to claim 3, further comprising;

a pattern calculator to calculate a pattern of electric braking used for control of the electric motor according to the required braking force, and to output the calculated pattern.

9. The brake control device for an electric vehicle according to claim 3, wherein
the adjuster outputs the electric braking force calculated by the electric braking force calculator, when a first braking force calculated from a first formula is larger than a second braking force calculated from a second formula, wherein
(i) the first formula comprises: a relationship between the speed of the electric motor and the electric braking force required to obtain a required braking force, and
(ii) the second formula comprises: when the speed of the electric motor is such that the electric braking force alone does not obtain the deceleration due to a decrease in a speed of the electric motor, a formula obtained by subtracting from each value of the electric breaking force a fixed amount based on a deceleration of the electric motor calculated based on the required braking force and a load of the vehicle; and
adjusts, to a smaller value, the electric braking force calculated by the electric braking force calculator and then outputs the adjusted electric braking force when the first braking force is equal to or smaller than the second braking force.

10. The brake control device for an electric vehicle according to claim 8, wherein
the adjuster outputs the electric braking force calculated by the electric braking force calculator, when a first braking force calculated from a first formula is larger than a second braking force calculated from a second formula, wherein
(i) the first formula comprises: a relationship between the speed of the electric motor and the electric braking force required to obtain a required braking force, and
(ii) the second formula comprises: when the speed of the electric motor is such that the electric braking force alone does not obtain the declaration due to a decrease in a speed of the electric motor a formula obtained by subtracting from each value of the electric braking force a fixed amount based on a deceleration of the electric motor calculated based on the required braking force and a load of the vehicle; and
adjusts, to a smaller value, the electric braking force calculated by the electric braking force calculator and then outputs the adjusted electric braking force when the first braking force is equal to or smaller than the second braking force.

11. The brake control device for an electric vehicle according to claim 1, further comprising;
a mechanical braking controller to calculate a mechanical braking command by subtracting from the required braking force the electric braking force outputted by the adjuster, and to transmit the calculated mechanical braking command to a mechanical brake.

12. The brake control device for an electric vehicle according to claim 11, wherein
the adjuster outputs the electric braking force calculated by the electric braking force calculator, when a first braking force calculated from a first formula is lamer than a second braking force calculated from a second formula, wherein
(i) the first formula comprises: a relationship between the speed of the electric motor and the electric braking force required to obtain a required braking force, and
(ii) the second formula comprises: when the speed of the electric motor is such that the electric braking force alone does not obtain the deceleration due to a decrease in a speed of the electric motor, a formula obtained by subtracting from each value of the electric braking force a fixed amount based on a deceleration of the electric motor calculated based on the required braking force and a load of the vehicle; and
adjusts, to a smaller value, the electric braking force calculated by the electric braking force calculator and then outputs the adjusted electric braking force when the first braking force is equal to or smaller than the second braking force.

13. The brake control device for an electric vehicle according to claim 11, further comprising;
a pattern calculator to calculate a pattern of electric braking used for control of the electric motor according to the required braking force, and to output the calculated pattern.

14. The brake control device for an electric vehicle according to claim 13, wherein
the adjuster outputs the electric braking force calculated by the electric braking force calculator, when a first braking force calculated from a first formula is lamer than a second braking force calculated from a second formula, wherein
(i) the first formula comprises: a relationship between the speed of the electric motor and the electric braking force required to obtain a required braking force, and
(ii) the second formula comprises: when the speed of the electric motor is such that the electric braking force alone does not obtain the declaration due to a decrease in a speed of the electric motor, a formula obtained by subtracting from each value of the electric braking force a fixed amount based on a deceleration of the electric motor calculated based on the required braking force and a load of the vehicle; and
adjusts, to a smaller value, the electric braking force calculated by the electric braking force calculator and then outputs the adjusted electric braking force when the first braking force is equal to or smaller than the second braking force.

15. The brake control device for an electric vehicle according to claim 1, further comprising;
a pattern calculator to calculate a pattern of electric braking used for control of the electric motor according to the required braking force, and to output the calculated pattern.

16. The brake control device for an electric vehicle according to claim 15, wherein
the adjuster outputs the electric braking force calculated by the electric braking force calculator, when a first braking force calculated from a first formula is lamer than a second braking force calculated from a second formula, wherein (i) the first formula comprises: a relationship between the speed of the electric motor and the electric braking force required to obtain a required braking force, and (ii) the second formula comprises: when the speed of the electric motor is such that the electric braking force alone does not obtain the deceleration due to a decrease in a speed of the electric motor, a formula obtained by subtracting from each value of the electric braking force a fixed amount based on a deceleration of the electric motor calculated based on the required braking force and a load of the vehicle; and adjusts, to a smaller value, the electric braking force calculated by the electric braking force calculator and then outputs the adjusted electric braking force when the first braking force is equal to or smaller than the second braking force.

* * * * *